United States Patent
Lovchik et al.

(10) Patent No.: US 6,939,213 B2
(45) Date of Patent: Sep. 6, 2005

(54) QUICK CHANGE ADAPTOR FOR ROTARY MACHINES

(75) Inventors: Christopher Scott Lovchik, Pearland, TX (US); James David Jochim, Nassau Bay, TX (US)

(73) Assignee: LHR Technologies, Inc., Pasadena, TX (US)

( * ) Notice: Subject to any disclaimer, the term of this patent is extended or adjusted under 35 U.S.C. 154(b) by 54 days.

(21) Appl. No.: 10/392,452

(22) Filed: Mar. 18, 2003

(65) Prior Publication Data

US 2003/0178797 A1 Sep. 25, 2003

Related U.S. Application Data

(60) Provisional application No. 60/367,642, filed on Mar. 25, 2002.

(51) Int. Cl.[7] .............................................. B23B 31/04
(52) U.S. Cl. ........................... 451/360; 409/232; 279/7; 408/239 A
(58) Field of Search .......................... 451/360; 409/232, 409/234; 279/8, 101, 91, 138, 145, 904; 408/239 A, 239 R

(56) References Cited

U.S. PATENT DOCUMENTS

| | | | |
|---|---|---|---|
| 2,491,605 A | 12/1949 | Chittenden | 279/56 |
| 3,622,169 A | 11/1971 | Koch et al. | 279/1 |
| 3,708,178 A | 1/1973 | Lauricella | 279/81 |
| 3,967,830 A | 7/1976 | Smith | 279/16 |
| 4,436,463 A | 3/1984 | Rea | 409/232 |
| 4,621,407 A | 11/1986 | Suzuki | 29/568 |
| 4,710,079 A | * 12/1987 | Smith et al. | 409/234 |
| 4,810,139 A | * 3/1989 | Regan | 408/239 A |
| 4,834,596 A | * 5/1989 | Hollifield et al. | 409/232 |
| 4,906,147 A | * 3/1990 | Friesinger et al. | 409/232 |
| 5,340,247 A | 8/1994 | Cuneo et al. | 409/202 |
| 5,372,465 A | * 12/1994 | Smith | 409/232 |
| 5,833,407 A | 11/1998 | Senda | 409/131 |
| 5,885,039 A | * 3/1999 | Boisvert | 409/232 |
| 5,988,957 A | * 11/1999 | Wheeler | 408/239 R |
| 6,019,554 A | 2/2000 | Hong | 409/132 |
| 6,347,259 B1 | 2/2002 | Goldenberg et al. | 700/218 |
| 6,722,668 B2 | * 4/2004 | Huggins et al. | 279/29 |

FOREIGN PATENT DOCUMENTS

| | | | |
|---|---|---|---|
| GB | 686089 | 5/1951 | 80/83 |
| WO | WO 95/32830 | 12/1995 | |
| WO | WO 03/009951 | 2/2003 | |

OTHER PUBLICATIONS

PCT/US03/09074 International Search Report Mailed Nov. 20, 2003.
PCT/US02/23912 International Search Report Mailed Mar. 14, 2003.

* cited by examiner

*Primary Examiner*—Lee D. Wilson
*Assistant Examiner*—Anthony Ojini
(74) *Attorney, Agent, or Firm*—Trop, Pruner & Hu, P.C.

(57) ABSTRACT

In one embodiment, the present invention includes an apparatus including an adaptor body having a first end to be coupled to a rotary device and a second end having a tapered portion, and a tool adaptor dimensioned to fit within the tapered portion, the tool adaptor having a receiving end to receive a tool, such as a bit.

20 Claims, 9 Drawing Sheets

US 6,939,213 B2

QUICK CHANGE ADAPTOR FOR ROTARY MACHINES

This application claims priority to the U.S. Provisional Patent Application No. 60/367,642 filed on Mar. 25, 2002 in the name of Christopher Scott Lovchik and James David Jochim entitled TOOL FREE, QUICK RELEASE, SPRING ACTUATED CHUCK.

BACKGROUND

The present invention relates to an adaptor device, and more particularly to a quick-change adaptor for cutting tools.

Currently, no simple and inexpensive quick-change (QC) devices exist for swapping cutting bits in and out of standard rotary cutting machines. Machines such as routers, grinders, and small mills have the capacity to use thousands of cutting bits but unfortunately lack an easy or quick way to switch between these bits. Standard bit changing procedures typically require the user to either manipulate two individual tools or manipulate one tool while the preventing the machine shaft from rotating.

For example, routers such as CRAFTSMAN™ routers (available from Sears Co., Chicago, Ill.) use a split collet and jam nut to secure a cutting bit to a router. In such a configuration, the collet uses the bore in the router shaft for alignment. The bore is the only precision surface needed, and the outside diameter and the threads can have considerable error with little to no adverse affect on the performance of the router. However, no quick adaptor exists for such a router or other rotary machine.

Thus a need exists for an adaptor to provide for quick and easy tool changing. More so, a need exists to provide such quick tool changing that can handle errors in a machine shaft and threaded adaptor device.

SUMMARY OF THE INVENTION

Embodiments of the present invention provide a compact and inexpensive way to allow quick and easy tool changing. Such devices can be readily actuated with one hand and requires no additional tooling or procedures (for either tool insertion or release). In certain embodiments, a device may be used in automated bit changers in certain machines. The small size of the device allows it to be used with small hand grinders or woodworking routers without significantly increasing the effective machine spindle length. As such, most existing tools can be retrofitted with this device without affecting their performance. Certain embodiments of the device may also incorporate several safety features that protect against inadvertent release of a spinning bit.

DETAILED DESCRIPTION

Figure 1:
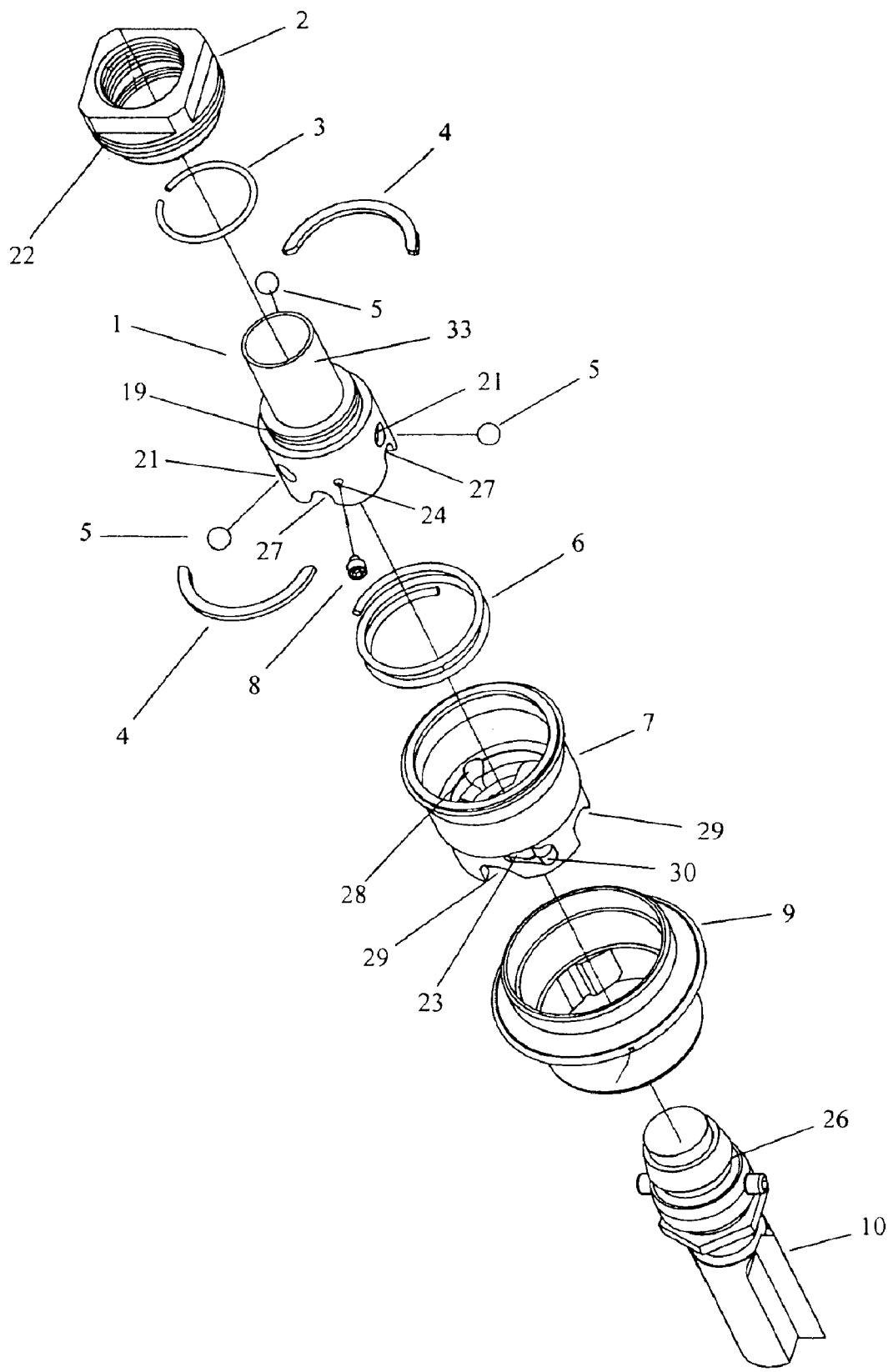
FIG. 1 shows an exploded view of a preferred embodiment of a quick-change assembly.

Referring to FIG. 1, shown is a quick-change assembly in accordance with one embodiment of the present invention. As shown in FIG. 1, the assembly includes a quick-change body (1), a quick-change body adaptor nut (2), a QC body adaptor nut retaining ring (3), two force compensation half rings (4), locking balls (5), an actuating spring (6), an actuating collar (7), an actuating collar cam pin (8), an actuating collar shroud (9), and a bit adaptor assembly (10) which, in this embodiment may be an adaptor for a ½" bit.

In forming the QC assembly, the QC body adaptor nut retaining ring (3) may be inserted into a retaining ring groove (19) on the quick-change body (1), and the quick-change body adaptor nut (2) may be slipped down onto the body (1) and snapped over the ring (3). In this embodiment an internal groove (20) (shown in FIG. 4) in the quick-change body adaptor nut (2) captures the retaining ring (3) and may prevent the nut (2) from being separated from the body (1) without rigidly constraining the nut (2) to the body (1).

In further formation of the assembly, the locking balls (5) may be inserted into holes (21) on the QC body (1) and two force compensation half rings (4) may be inserted into a groove (22) (also shown in FIG. 4) on the QC body adaptor nut (2). The actuating spring (6) is inserted into the actuating collar (7) and both may be slipped over the base of the QC body (1). The actuating collar cam pin (8) is inserted through the cam slot (23) in the actuating collar (7) and into the threaded hole (24) in the QC body (1). Once the actuating collar cam pin (8) is in place the movement of the actuating collar (7) may be constrained to only that allowed by the geometry of the cam slot (23). The actuating collar shroud (9) is pressed onto the outside of the actuating collar (7), locking the shroud (9) and actuating collar (7) together.

Figure 2:
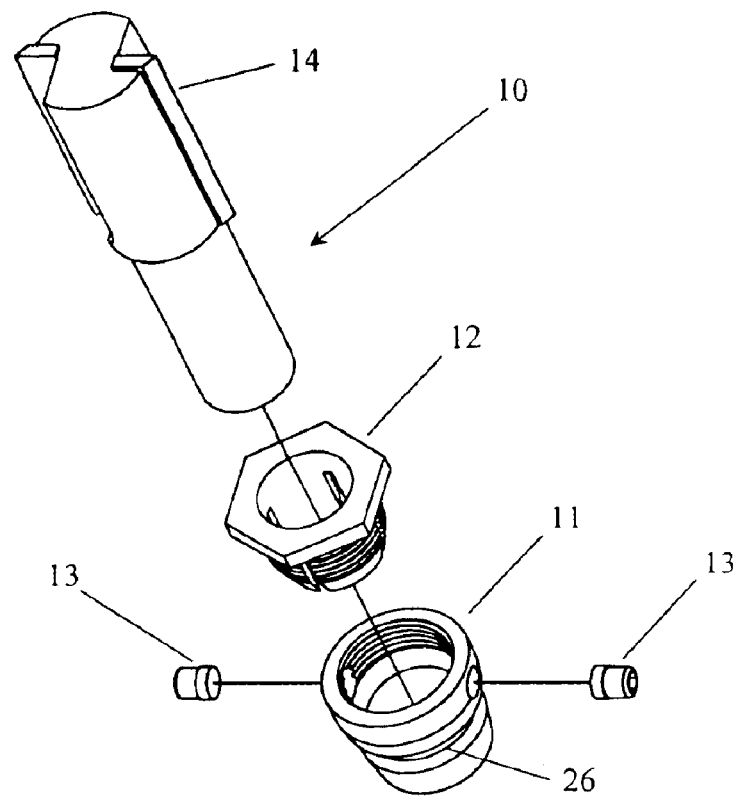
FIG. 2 shows an exploded view of a bit adaptor assembly in accordance with one embodiment of the present invention.
Figure 3:
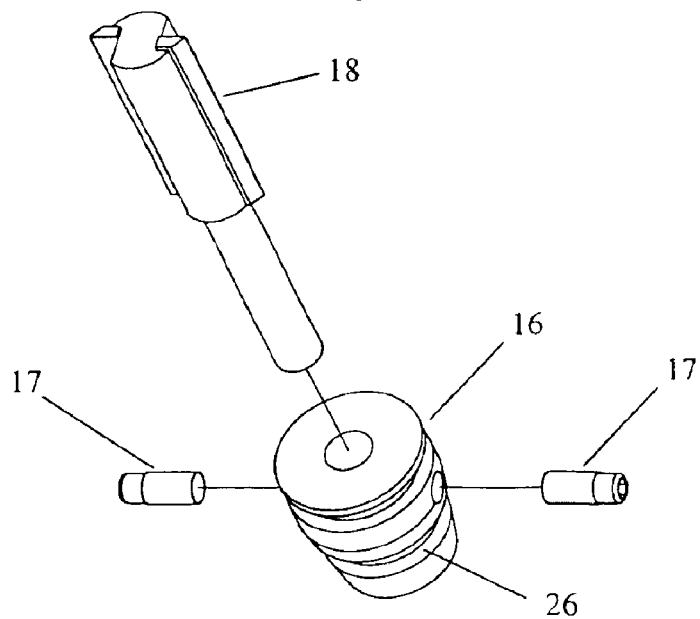
FIG. 3 shows an exploded view of a bit adaptor assembly in accordance with another embodiment of the present invention.

Any number of bit adaptor assemblies can be constructed using either a collet system or a setscrew system as shown in FIGS. 2 and 3 respectively. Adaptor assemblies may be made to accommodate any standard or non-standard shank size. FIG. 2 shows an example embodiment of a ½" bit adaptor assembly (10), which is constructed by inserting a ½" cutting bit (14) into a ½" bit adaptor collet (12), which is then threaded into the ½" bit adaptor body (11). Two bit adaptor torque pins (13) are threaded into the bit adaptor body (11) and may carry the machine spindle torque from the QC body (1) to the ½" bit adaptor body (11) and finally to the cutting bit (14). In various embodiments, bit adaptor body (11) may be tapered to fit within adaptor body (1). While the angle of such taper may vary, in certain embodiments the angle may be greater than approximately 15°.

FIG. 3 shows an example embodiment of a ¼" bit adaptor assembly (15) for a standard ¼" diameter shank bit. In one embodiment, this may be the preferred way to secure a ¼" bit. As shown in FIG. 3, assembly (15) includes a ¼" bit adaptor body (16), two bit adaptor setscrew/torque pins (17), and a ¼" shank bit (18). The assembly may be constructed by inserting the ¼" cutting bit (18) into the bit adaptor body (16). Two bit adaptor setscrew/torque pins (17) are threaded into the bit adaptor body and tightened against the bit shank. These setscrews/torque pins (17) may carry the machine spindle torque from the QC body (1) to the ¼" bit adaptor body (16) and finally to the cutting bit (18).

Figure 4:
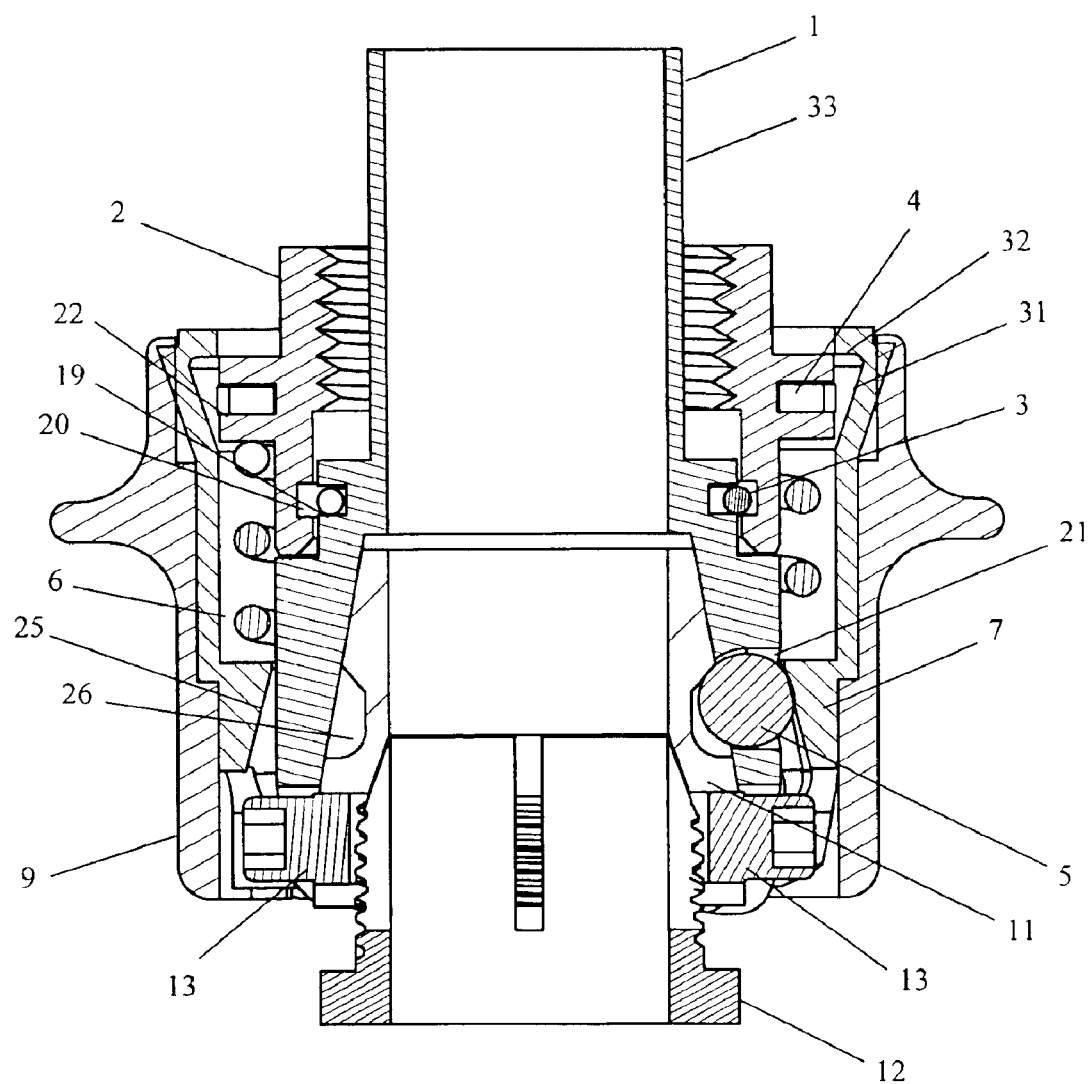
FIG. 4 shows a cross-sectional view of a QC adaptor assembly in accordance with one embodiment of the present invention.
Figure 5:
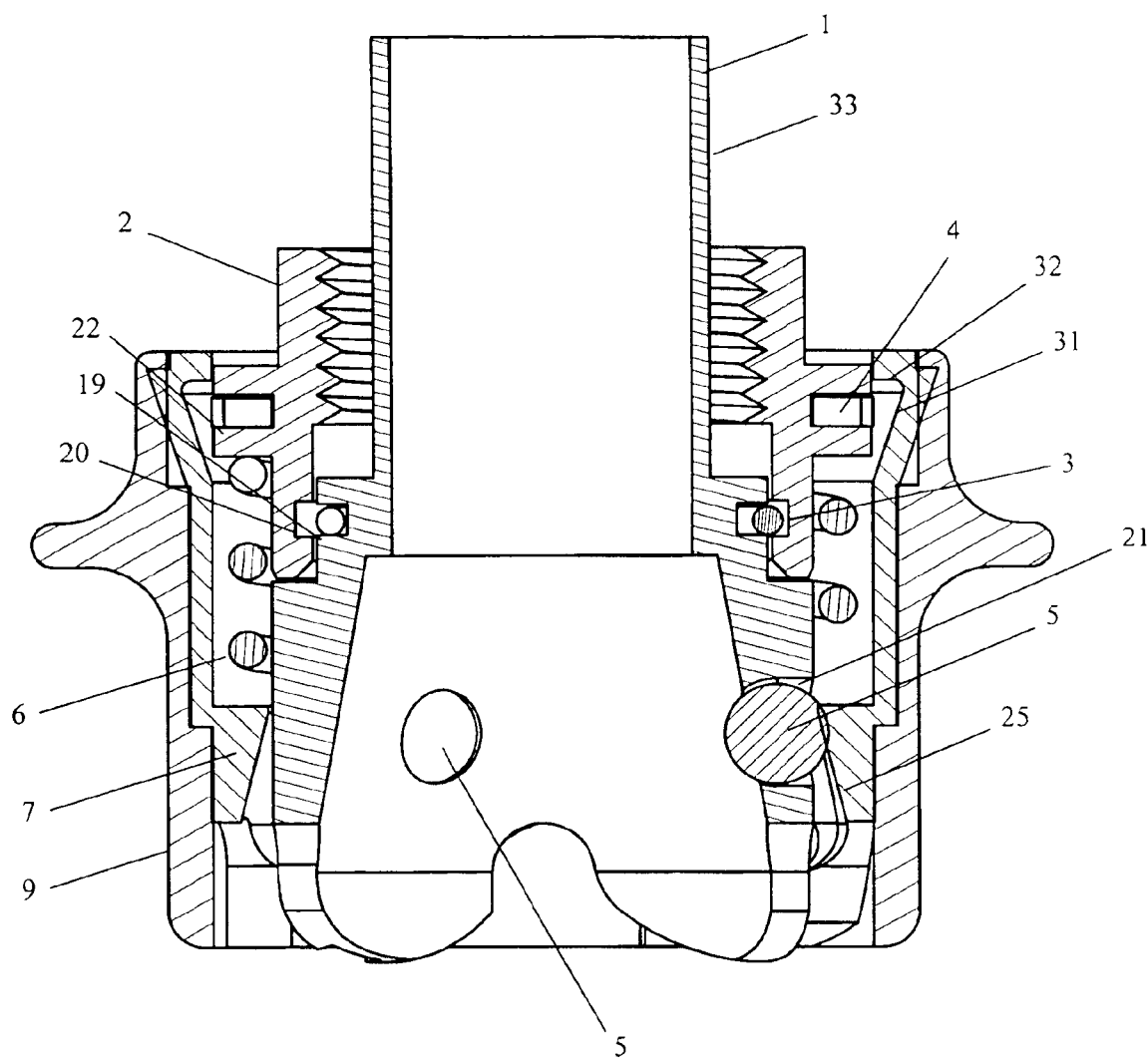
FIG. 5 shows a cross-sectional view of the QC adaptor of FIG. 4 without a bit adaptor assembly present.

Referring now to FIG. 4, shown is a cross section of a QC adaptor assembly in accordance with one embodiment of the present invention. Referring also to FIG. 5, shown is the QC adaptor of FIG. 4 without a corresponding bit adaptor assembly. The non-ridged constrain of the QC body (1) through the adaptor nut retaining ring (3) to the quick-change body adaptor nut (2) allows the collet interface surface (33) to align true to the tool without any off-axis influence from the threads of the quick-change body adaptor nut (2). Using this configuration, the quick-change body adaptor nut (2) and the collet interface surface (33) may be matched to fit and run true on any existing any removable collet and nut tool interface.

Figure 6:
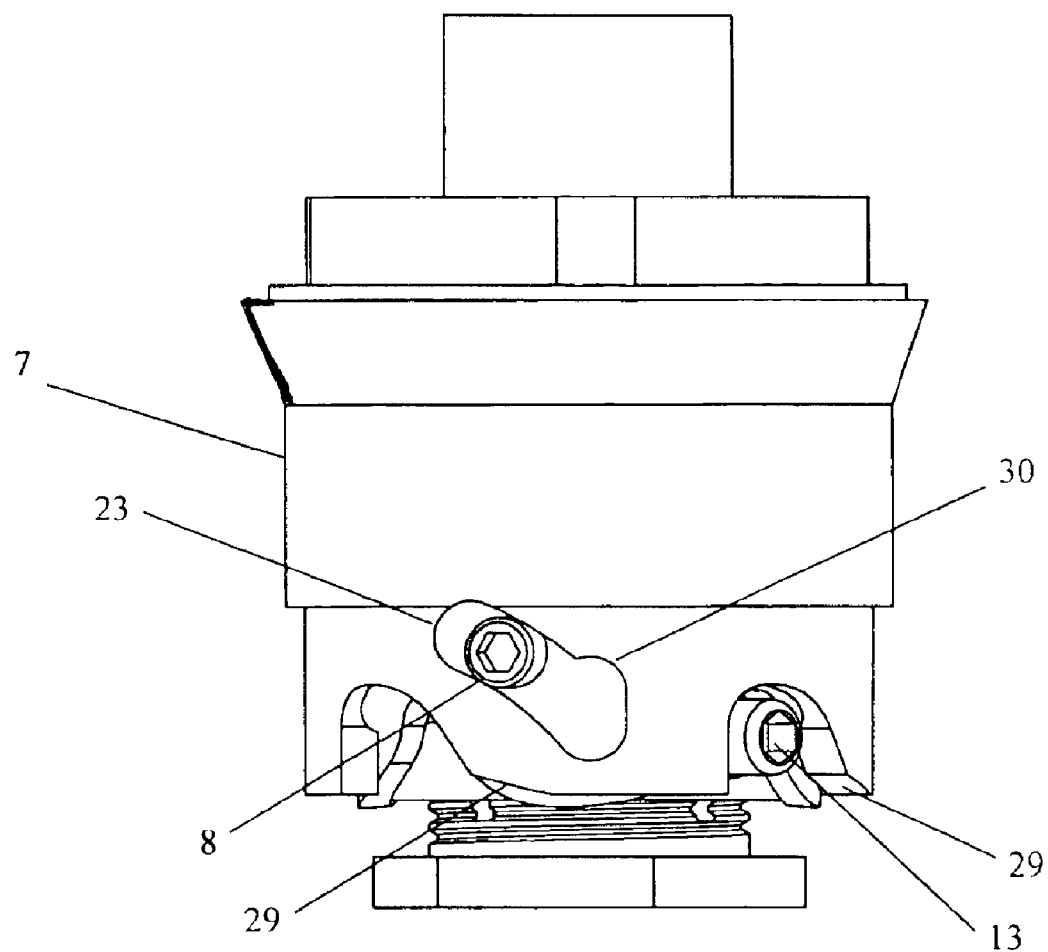
FIG. 6 shows a fully assembled quick-change device without a bit or actuating collar shroud in accordance with one embodiment of the present invention.

Referring now to FIG. 6, shown are details of the cam slot (23) in the actuating collar (7) in accordance with one embodiment of the present invention. Operationally, the actuating spring (6) may push the actuating collar (7) down. Due to the cam pin (8) riding in the cam slot (23), the actuating collar (7) may be forced to rotate as it moves down. As the actuating collar (7) moves down a tapered surface (25) (shown in FIG. 5) on its inner diameter, the actuating collar (7) presses the locking balls (5) inward and into a tapered groove (26) (shown in FIG. 4) on the bit adaptor body (11), thereby preloading the bit adaptor assembly (10) upward into the QC body (1) taper. To insert the bit adaptor assembly (10), a user may simply lift up on the actuating collar shroud (9). Such action may remove the inward pressure on the locking balls (5), allowing them to move outward, which then allows the bit adaptor assembly (10) to be inserted into the quick-change assembly.

In certain embodiments, the exterior taper on the bit adaptor body (11) may match the interior taper of the quick-change body (1) to insure accurate axial bit alignment. The heads of the bit adaptor torque pins (13) may protrude and be constrained by grooves or sculpted slots (27) on the QC body (1). These sculpted slots (27) may allow the machine spindle torque to be transferred through the QC body (1) to the torque pins and finally to the spinning bit. More so, sculpted slots (27) permit a bit adaptor assembly (10) to be inserted in any angular position, as the slots (27) will guide bit adaptor assembly (10) to the proper seating. As such the bit adaptor assembly (10) can be inserted blind and it will still be properly engaged in adaptor body (1). In various embodiments, simply lifting up on the actuating collar (7) may release the bit adaptor assembly (10).

In certain embodiments, the cam slot (23) may provide several safety features. Such features may include an inertial lock, an anti-ball jam lock, as well as audible and visual indication of correct bit insertion. The inertial lock may utilize the rotational motion of the actuating collar (7) dictated by the control (i.e., cam) slot (23) in the actuating collar (7) and cam pin (8) attached to the QC body (1). If the actuating collar is pulled up, as if to release the bit assembly, it is forced to rotate opposite the running direction of the machine spindle. As the machine is spun up, the actuating collar (7) lags the QC body (1) because of its rotational inertia. This lag forces the cam pin (8) to travel down the cam slot (23), which pushes the actuating collar (7) further down, which adds to the inward force of the locking balls (5) that holds the bit adaptor assembly (10) in place. The crescent shape of the cam slot (23) maximizes the inertial force by providing and increasing force angle as the actuating collar (7) rotates. The geometry of the cam slot (23) may also ease actuation of the actuating collar (7) by reducing the force angle when the actuating collar (7) is depressed.

Full rotation of the actuating collar (7), as dictated by the cam slot (23), may be required in order to insert or remove a bit adaptor assembly (10) in certain embodiments. Internal ball relief grooves (28) (see FIG. 1) on the inner diameter of the actuating collar (7) allow the locking balls (5) to fully retract only at the proper rotational position. If for any reason the actuating collar (7) is jammed and is prevented from fully rotating, the locking balls (5) will not allow insertion or removal of the bit adaptor assembly (10).

Referring again to FIG. 6, in certain embodiments tapered surfaces (29) on the actuating collar (7) also may engage the bit adaptor torque pins (13) and help to rotate the collar (7) to the correct position during insertion and help unseat the bit adaptor assembly (10) during removal. When the actuating collar (7) is pressed up, the actuating collar (7) is rotated opposite the running direction of the router, and the bit adaptor assembly (10) is pushed down and out by the tapered surfaces (29). When the actuating collar (7) is fully depressed, the cam pin (8) moves into and catches in a detent (30) in the control slot (23). This is the cocked position. A bit adaptor assembly (10) can only be installed when the quick-change body (1) is in this position.

In certain embodiments, a bit adaptor assembly (10) is installed by simply pushing it into quick-change body (1). The bit adaptor torque pins (13) engage the tapered surfaces (29) on the actuating collar (7), forcing it to rotate in the running direction of the router. Once the collar (7) is rotated out of the control slot detent (30), the actuation spring (6) takes over and it snaps the actuating collar (7) down, grabbing the bit adaptor assembly (10). The snap of the actuating collar (7) provides an audible indication that the bit adaptor assembly (10) has been properly seated. Due to the rotation of the actuating collar (7), a further visual indication may be given when marks on the QC body (1) and on the actuating collar (7) are in alignment. If these marks do not line up, then the bit adaptor assembly (10) has not been properly installed.

The force-compensating half rings (4) provide another safety feature in certain embodiments. During operation the half rings (4) are thrown outward by centrifugal acceleration against a tapered surface (31) (shown in FIG. 4) on the inner diameter of the actuating collar (7), thereby forcing it down. This downward force helps assure that the collar (7) does not lift up during operation, thereby releasing the spinning bit assembly (10). This downward force is proportional to the mass of the half rings (4), their distance from the axis of rotation, the angle of the tapered surface (31) and the square of the spindle's angular velocity—and may be optimized for the particular machine application. In an alternate embodiment, these half rings (4) may also act as a retaining ring by preventing the actuating collar (7) from slipping off of the QC body (1) by protruding partially under the inner lip (32) on the actuating collar (7). The inner diameter of the half rings (4) may be slightly smaller than the root diameter groove (22) on the QC body adaptor nut (2). This causes the half rings (4) to spring away from the QC body nut (2) at all times and insures that the QC body nut (2) cannot slip out of the actuating collar (7). Even with no tapered surface (31), these half rings (4) may provide resistance to the upward motion of the actuating collar (7).

The centrifugal force referred to earlier may produce a proportional frictional force between the half rings (4) and the actuating collar (7), which may oppose any motion in the collar (7), either up or down, that might result in bit assembly (10) release. The more massive the half rings (4) become the more frictional force that they are able to generate at any given rotational speed. More so, while described as half rings, it is to be understood that force compensation rings need not be fully semicircular and in certain embodiments, more than two such ring portions may be present.

Figure 7:
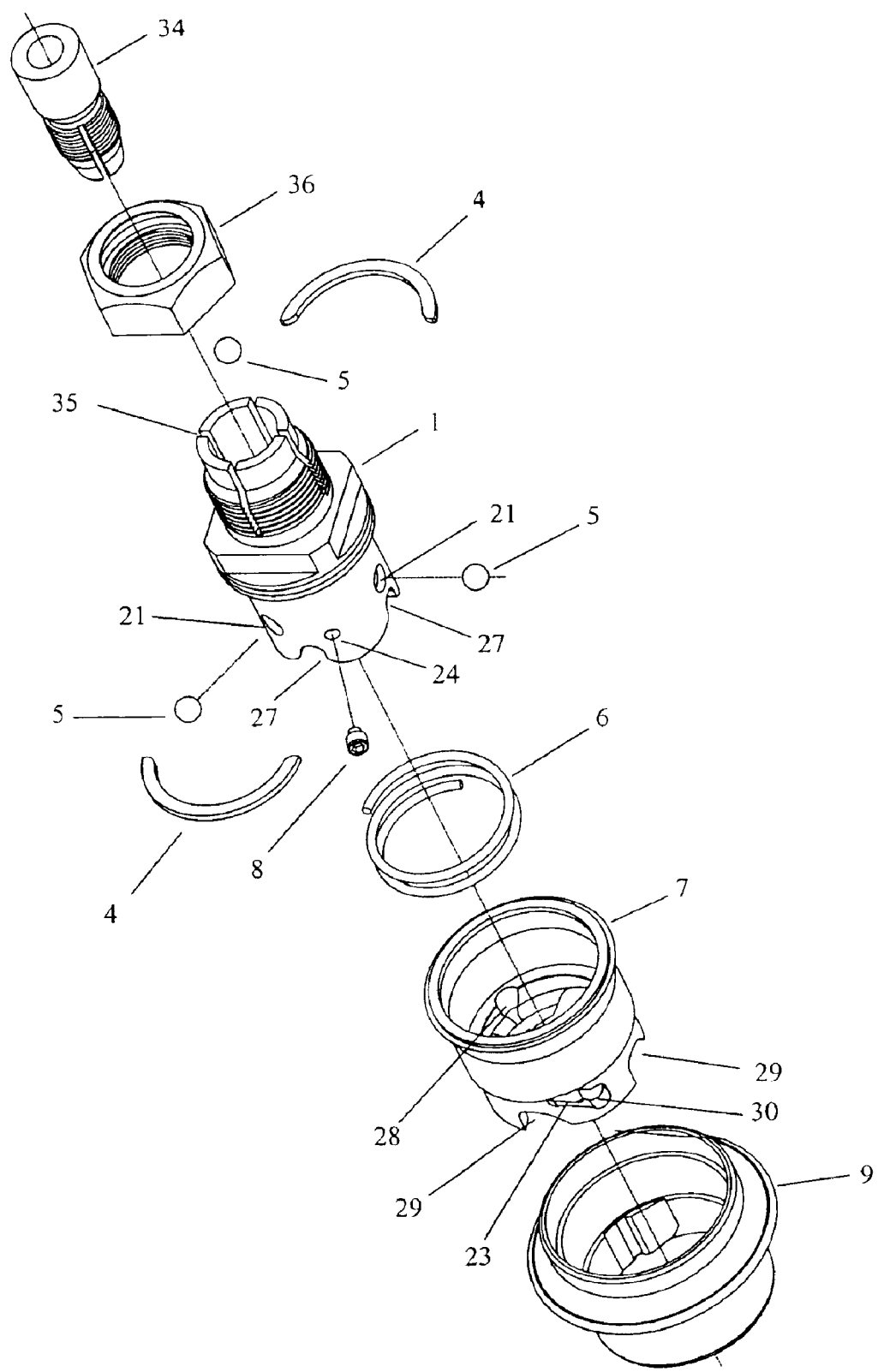
FIG. 7 shows an exploded view of an alternate QC assembly in accordance with one embodiment of the present invention.

Quick-change devices in accordance with embodiments of the present invention may be adapted to tools that do not have a removable collet as well as tools that have just a simple shaft. This is done by colleting to the shaft as shown in FIG. 7. As shown in the embodiment of FIG. 7, the quick-change body (1) may be split (35) at the end that engages a complex machine shaft (34). The QC body is slipped over the machine shaft (34) and the collet nut (36) is threaded up the QC body (1). This nut (36) forces the collet closed, thereby clamping to the machine shaft and eliminating motion between it and the QC body.

As discussed above, in various embodiments a quick-change assembly may be dimensioned to not significantly increase the effective machine spindle length. In certain embodiments, an assembly may vary depending on the machine in which it will be used. Further, while tool sizes may vary, in certain embodiments the quick-change assembly may accommodate tools having shanks up to ½" inch.

Figure 8:
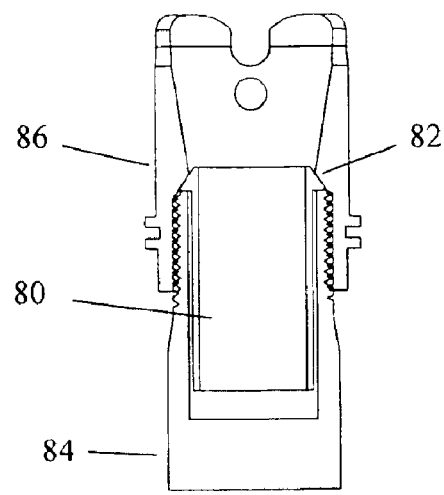
FIG. 8 shows a partial cross-sectional view of another alternate embodiment of a QC assembly.

As discussed above, certain routers use a split collet and jam nut to secure a bit. Referring now to FIG. 8, in certain embodiments a quick-change assembly may use a shaft adaptor (80), with an aligning surface (82), inserted into the bore in the router shaft (84) and a solid body (86), with a mating aligning surface, that threads onto the router. Such threads may be designed to be loose enough to handle any minor errors in the router shaft and allow the aligning surfaces to draw the quick-change into alignment with the router bore. In other aspects, this embodiment may be similar to the embodiment of FIG. 1.

The embodiment of FIG. 8 works well provided that the errors in the shaft and threads are not too great. However, precision bores may suffer from more significant radial errors and axial errors found in the outside diameters and threads of the bore.

Though many routers are within expectable ranges for such a quick-change design, other routers have both radial errors (concentricity) and axial errors (angular run out) that may exceed the capabilities of the embodiment of FIG. 8.

To prevent such deformation, the embodiment of FIG. 1 may be used. This embodiment advantageously may be formed using a two-part assembly having a quick-change head (i.e., body (1)) with the shaft adaptor (i.e., collet interface surface (33)) machined directly into it, and a separate threaded base (i.e., nut (2)) attached to the quick-change head by a retaining ring (3). The threaded base can move or float as the assembly is tightened down onto the router, allowing this configuration to handle extreme errors in both the shaft and the thread while maintaining precision alignment.

Figure 9:
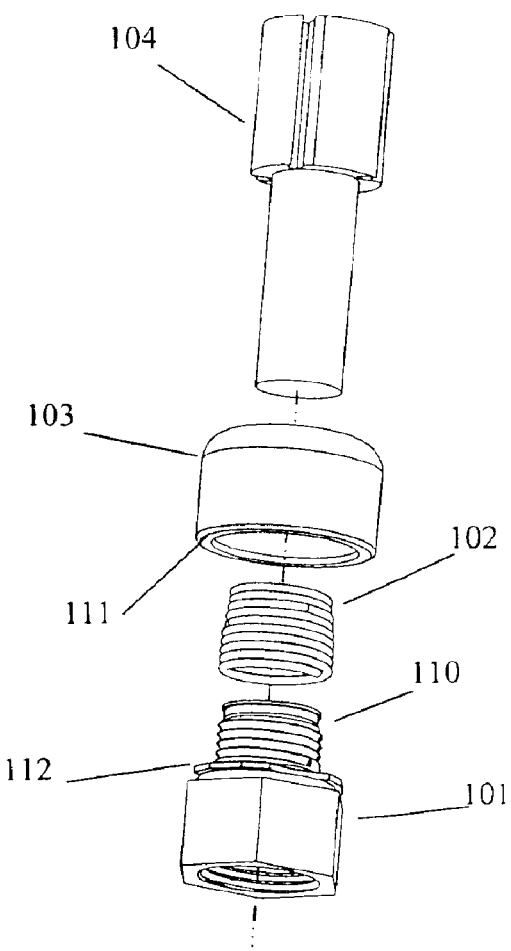
FIG. 9 shows an exploded view of a spring chuck assembly in accordance with one embodiment of the present invention.

In other embodiments, a spring-based quick-change adaptor may be used. FIG. 9 shows an embodiment of a spring chuck assembly. It includes a split-collet nut (101), a locking spring (102), a quick release cap (103), and a bit (104). In one embodiment, the device may be designed to accept a single shaft diameter (smaller bits can be accommodated by using shaft adaptors), although in other embodiments a device can accept any given bit diameter. Henceforth this standard shaft diameter will be referred to as the "bit shaft" or the "bit shaft diameter".

In the embodiment of FIG. 9, the split-collet nut (101) screws onto the rotary output shaft of the machine being used. The internal diameter of the split collet has no greater than a 0.001" clearance with the bit shaft diameter. The locking spring (102) is taper wound in the left hand direction. The internal diameter of the small side of the spring taper is set to be at least 0.005" smaller than the bit shaft diameter. The locking spring is threaded onto, and is retained by, a left hand thread (110) on the split-collet nut (101). This thread allows a set number of winds to be treaded onto the collet. Additional winds of the locking spring remain above the split-collet. The quick release cap (103) mounts over the locking spring (102) and an internal lip (111) snaps into a groove (112) in the split-collet nut (101). The bit is inserted into the chuck assembly by lightly pushing it into the split-collet while simultaneously rotating it in the counter-clockwise direction. To remove the bit, it may be rotated counter-clockwise and simultaneously pulled out.

This device works by utilizing the tension in the spring to hold the bit tight (and ground the input torque) when the machine output shaft rotates in the clockwise direction (cutting direction). In addition, the tension in the spring also serves to close or clamp the split collet around the bit, also grounding the torque. The phenomenon being utilized is described by the equation $T_{out}=T_{in}/e^{(\beta\upsilon)}$, where $T_{in}$ is the tension at one end of the spring, $\beta$ is the total angle through which the spring wire is wound, $\upsilon$ is the coefficient of friction between the spring and the surface that it is wound about, and $T_{out}$ is the tension at the opposite end of the spring. The locking spring is sized by setting $T_{in}$ to the maximum torque applied to the bit divided by the bit shaft radius $T_{out}$ is set to the tension created by stretching the wire around the bit or collet. The equation is then solved for the total wrap angle ($\beta$). This is the number of wraps of the spring needed to assure that the spring will not slip on the shaft. The same calculation is done to determine the number of locking spring wraps needed to ground the torque to the split-collet. It is important to note that this phenomenon acts only in only one direction (which is determined by the direction of spring wrap) and is the major reason that bit insertion and removal is so easy.

Figure 10:
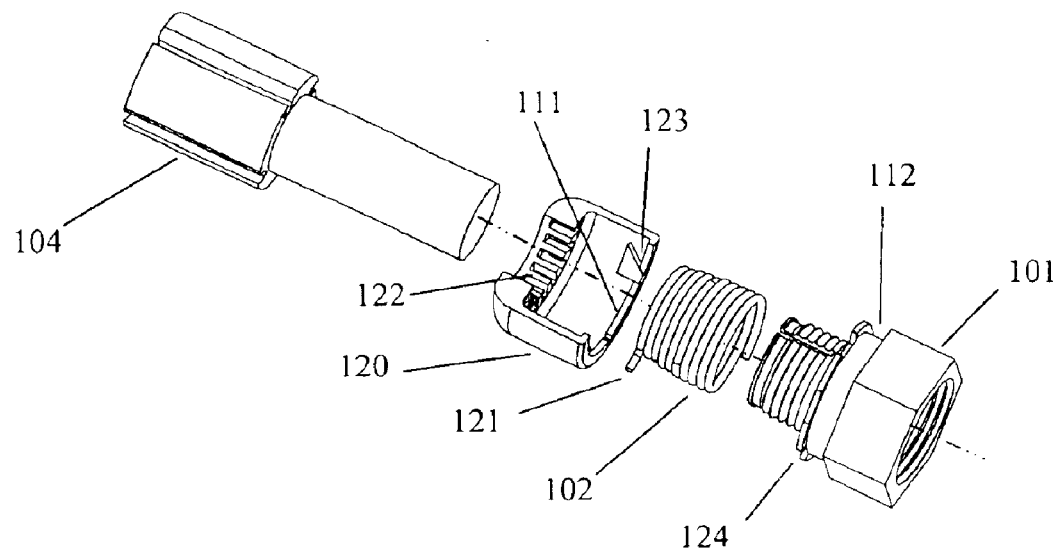
FIG. 10 shows an exploded, partial cross-section view of a spring chuck assembly in accordance with another embodiment of the present invention.

In certain embodiments, the insertion and removal of bits can be made even easier by the addition of the mechanism shown in FIG. 10. Or, the locking spring can be captured using an internal thread, which can be used to adapt this device to machines with existing split-collet shafts, as shown in FIG. 11.

Referring now to FIG. 10, shown is a partial cross-section including a split-collet nut (101), a locking spring (102), a cross-sectioned release cap (120), and a bit (104). The assembly is identical to that described for FIG. 9 above. The release cap (120) mounts over the locking spring (102) and snaps into the groove (112) on the split-collet nut (101) via internal lip (111). The tang (121) on the locking spring (102) rides in one of the multiple grooves (122) in the top of the release cap (120). The ramped surfaces (123) on the release cap (120) and the cuts (124) in the split-collet nut (101) cause the cap to rotate counter-clockwise when the cap is pushed axially inward toward the split-collet nut. The counter-clockwise rotation, in turn, forces the locking spring (102) to open, allowing the bit (104) to be inserted or removed without the need to rotate it.

Figure 11:
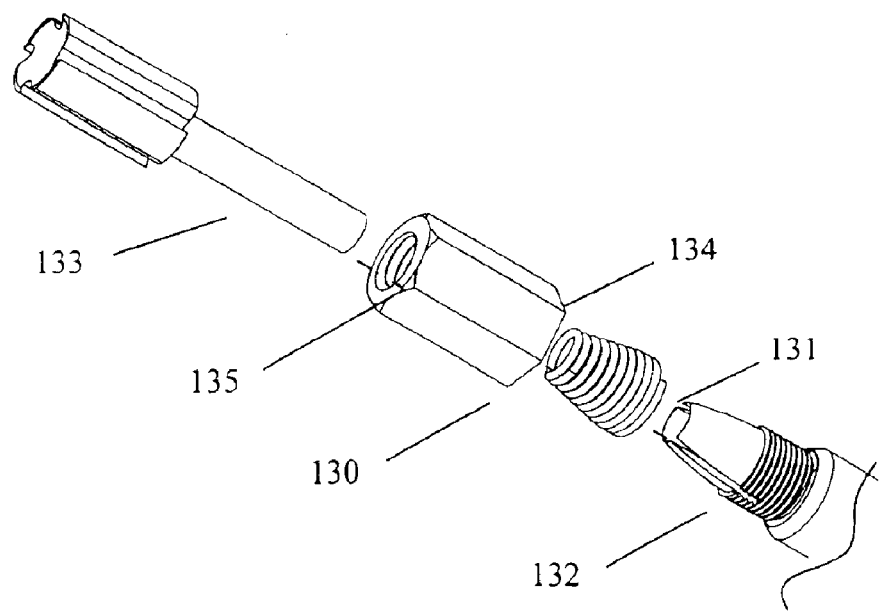
FIG. 11 shows an exploded view of a spring chuck assembly in accordance with still another embodiment of the present invention.

The embodiment shown in FIG. 11 includes a collet nut (130), a locking spring (131), an existing split-collet (132), and a bit (133). The split-collet nut (130) is constructed with two internal threaded regions; a right handed thread (134) which matches the machine shaft and a smaller left handed thread (135) that matches the outside diameter of the small end of the taper wound locking spring (131). The locking spring (131) is taper wound in the left hand direction. The spring's small end is fully threaded into the split-collet nut (130). The split-collet nut (130) screws onto the shaft of the machine being used. Once seated, the split-collet nut constrains the locking spring and allows the above spring locking phenomenon to occur. The bit (133) is inserted into the chuck by lightly pushing it into the split collet (132) while simultaneously rotating it counter-clockwise.

Figure 12:
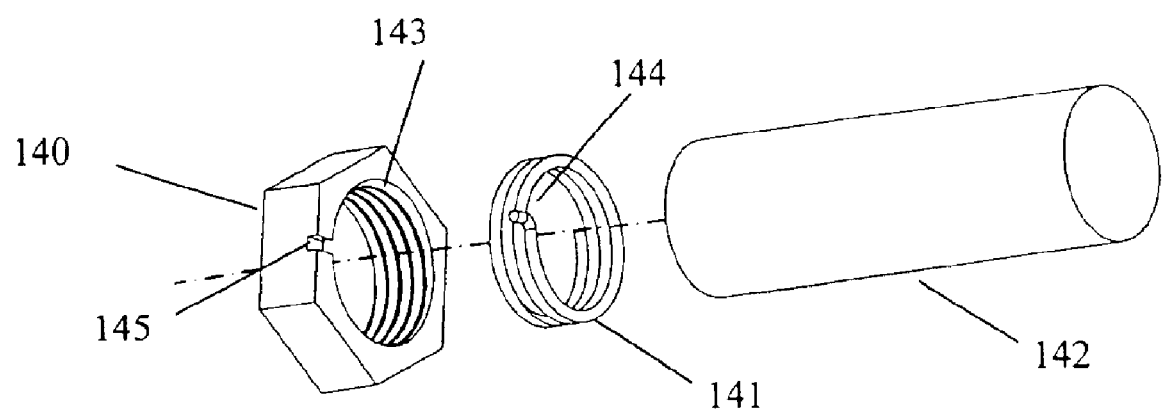
FIG. 12 shows a shaft clamp embodiment in accordance with the present invention.

This spring-lock phenomenon can also be used as a one-way shaft clamp or torque coupler configured as in FIG. 11 or as in FIG. 12.

The shaft clamp embodiment shown in FIG. 12 includes a shaft nut (140), a locking spring (141), and a shaft (142). The locking spring (141) is wound into the shaft nut (140) and is retained by the internal thread (143). The torque on the shaft is grounded by the tang (144) on the locking spring (141) that is snapped into the groove (145) on the shaft nut. The nut is inserted onto the shaft (142) by lightly pushing it in while at the same time rotating it in the direction opposite of the spring wind.

Embodiments of the present invention may incorporate a variety of interfaces for shaft attachment including a hollow shaft with the spring wound into it coupled to the outside diameter of a second shaft. Embodiments may also be made to lock in either rotational direction by varying the spring direction.

Devices in accordance with embodiments of the present invention may be designed using any number of actuating spring configurations. Such devices may incorporate a variety of interfaces for shaft attachment. Such devices may employ any number of different positive locking mechanisms, both passive and/or active. Such devices may use other geometries for torque grounding, bit alignment, and bit capture. The configuration may be altered to adapt to any number of rotary machines of all makes and models. The locking balls may be replaced by pins or wire forms that run in straight, angled, or other slot geometries.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   an adaptor having a first end and a second end, the first end to be coupled to a shaft of a rotary machine, the second end comprising a body movable in a first direction to receive a tool in locking relation, and movable in a second direction to release the tool from the locking relation;
   a collar disposed around the body and in movable relation to the body; and
   a tool adaptor coupled to the tool, the tool adaptor dimensioned to be fitted within the second end of the adaptor.

2. The apparatus of claim 1, further comprising a plurality of cam members to couple the collar to the body.

3. The apparatus of claim 1, wherein the first end comprises a shaft adaptor having a nut extending around the shaft adaptor, the nut non-rigidly constrained to a lower portion of the first end.

4. The apparatus of claim 1, wherein the rotary machine comprises a router.

5. An apparatus comprising:
   an adaptor body having a first end and a second end, the second end having a tapered internal portion, the first end to be coupled to a rotary device; and
   a tool adaptor coupled to the second end of the adaptor body and having a mating end dimensioned to fit within the tapered internal portion, the tool adaptor having a receiving end to receive a tool.

6. The apparatus of claim 5, further comprising a collar coupled to the adaptor body, the collar having at least one cam slot.

7. The apparatus of claim 6, further comprising at least one cam member positioned to move within the at least one cam slot of the collar.

8. The apparatus of claim 7, further comprising a spring coupled between the collar and the adaptor body.

9. An apparatus comprising:
   an adaptor body having a first end and second end, the first end dimensioned to be received in a spindle of a rotary cutting tool; and
   a threaded base coupled in movable relation to the adaptor body, the threaded base threadably coupled to the spindle.

10. The apparatus of claim 9, wherein the second end of the adaptor body comprises a quick change head to receive tools of differing sizes.

11. The apparatus of claim 9, further comprising a retaining ring to fit within a groove formed between the adaptor body and the threaded base to couple the adaptor body to the threaded base in the movable relation.

12. An apparatus comprising:
   a tool adaptor to be coupled to an adaptor device, the tool adaptor having a first end dimensioned to fit within a tapered internal portion of the adaptor device, the tool adaptor having a receiving end to receive a tool for a rotary machine.

13. The apparatus of claim 12, wherein the tool adaptor comprises:
   a collet to receive the tool; and
   an adaptor body coupled to the collet, the adaptor body having a tapered portion to fit within the tapered internal portion of the adaptor device.

14. The apparatus of claim 13, further comprising a groove within the tapered portion of the adaptor body to receive at least one locking member of the adaptor device.

15. The apparatus of claim 12, further comprising first and second set screws to couple the tool to the tool adaptor, the first and second set screws to be received in slots of the adaptor device to carry torque from the rotary machine to the tool.

16. An apparatus comprising:
   an adaptor body having a first end and a second end, the first end to be coupled to a rotary machine;

an actuating collar coupled in movable relation to the adapter body; and a tool adaptor to be coupled to a tool, the tool adaptor dimensioned to be fitted within the second end of the adaptor body.

17. The apparatus of claim 16, wherein the actuating collar is movable in a first direction to receive the tool in locking relation, and movable in a second direction to release the tool from the locking relation.

18. The apparatus of claim 16, further comprising a plurality of cam members to couple the actuating collar to the adaptor body.

19. The apparatus of claim 16, further comprising a plurality of force compensation ring members to lock the actuating collar.

20. The apparatus of claim 16, further comprising an inertial lock in the actuating collar.

* * * * *